(No Model.)

J. H. & G. L. BAXTER.
GARDEN IMPLEMENT.

No. 430,821. Patented June 24, 1890.

WITNESSES:
J. A. E. Cruswell
C. Sedgwick

INVENTOR:
J. H. Baxter
G. L. Baxter
BY Munn & Co.
ATTORNEYS.

UNITED STATES PATENT OFFICE.

JAMES H. BAXTER AND GERMAN LEVI BAXTER, OF LEXINGTON, KENTUCKY.

GARDEN IMPLEMENT.

SPECIFICATION forming part of Letters Patent No. 430,821, dated June 24, 1890.

Application filed August 3, 1889. Serial No. 319,604. (No model.)

*To all whom it may concern:*

Be it known that we, JAMES H. BAXTER and GERMAN LEVI BAXTER, both of Lexington, in the county of Fayette and State of Kentucky, have invented a new and Improved Garden Implement, of which the following is a specification, reference being had to the annexed drawings, forming a part thereof, in which—

Figure 1:
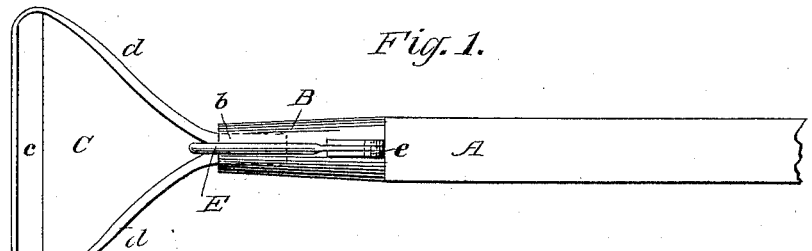
Figure 2:
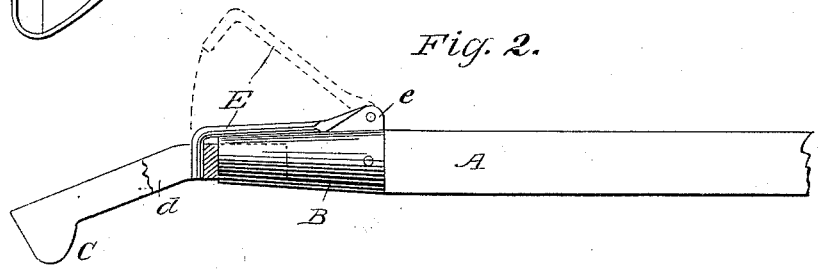
Figure 3:
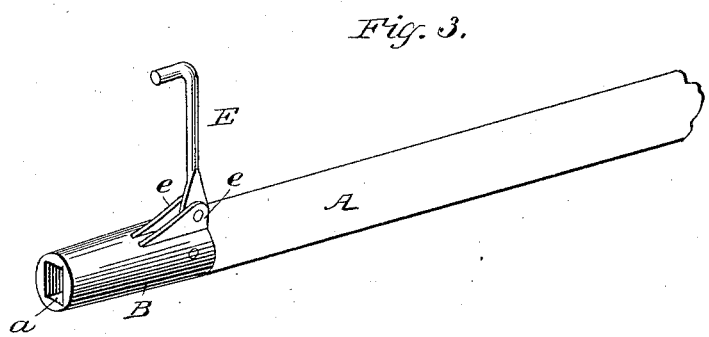
Figure 4:
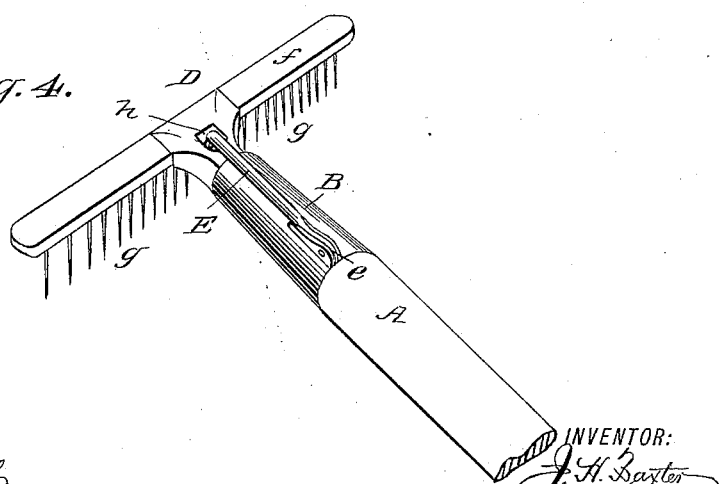

Figure 1 is a plan view of our improved garden implement. Fig. 2 is a side elevation, partly in section. Fig. 3 is a perspective view of the handle, and Fig. 4 shows the implement arranged as a rake.

Similar letters of reference indicate corresponding parts in all the views.

The object of our invention is to provide a simple and effective implement for cutting up weeds, loosening the soil, and gathering up and removing weeds, stones, &c.

The invention consists in the particular construction and arrangement of parts, as hereinafter fully described, and pointed out in the claim.

The handle A is provided at its extremity with a metallic socket B, having a square hole $a$ for receiving the shank $b$ of the hoe C or the rake D. The hoe C is in the form of a triangular loop, one side of the loop forming a cutting-blade $c$, the sides $d$ $d$ of the loop forming connections between the blade $c$ and the shank $b$. The hoe C is arranged at a slight angle to the shank $b$, and its cutting-edge is extended a short distance along the sides $d$ $d$.

The socket B is provided with ears $e$, between which is pivoted one end of a hook E, the right-angled end of which is capable of entering the angle of the loop of the hoe and holding the shank $b$ in the said socket B.

The rake D, which is fitted to the socket B, is provided with a cross-arm $f$, in which are inserted teeth $g$. The rake-head is provided with an aperture $h$ for receiving the end of the hook E.

Our improved hoe is easily handled, and is effective in cutting up weeds and lifting the soil.

Having thus described our invention, we claim as new and desire to secure by Letters Patent—

A garden implement comprising a handle having a socket in its end and provided with a pivoted hook and a hoe consisting of a blade, a shank, and arms extending from the ends of the blade to the shank, the hook of the handle being adapted to enter the angle of the loop formed by the arms, substantially as described.

JAMES H. BAXTER.
GERMAN LEVI BAXTER.

Witnesses:
J. W. PARRISH,
JAS. SMITH.